United States Patent [19]

Shinno et al.

[11] Patent Number: 4,981,545
[45] Date of Patent: Jan. 1, 1991

[54] AUTOMATIC TAPE AFFIXING APPARATUS

[75] Inventors: Nobuo Shinno; Yasuhiro Ohnishi, both of Osaka, Japan

[73] Assignee: Shinnippon Koki Kabushiki Kaisha, Osaka, Japan

[21] Appl. No.: 345,131

[22] Filed: Apr. 28, 1989

[30] Foreign Application Priority Data

May 7, 1988 [JP] Japan .................................. 63-110772

[51] Int. Cl.$^5$ ...................... B44C 7/06; B65H 23/025; B65H 29/54
[52] U.S. Cl. ................................. 156/361; 156/574; 226/191
[58] Field of Search ................ 156/574, 361; 226/186, 226/187, 191, 196

[56] References Cited

U.S. PATENT DOCUMENTS

| | | | |
|---|---|---|---|
| 2,858,130 | 10/1958 | Baur et al. | 226/183 |
| 3,752,378 | 8/1973 | Scheffel | 226/191 |
| 4,555,299 | 11/1985 | Voltmer et al. | 156/552 |
| 4,624,399 | 11/1986 | Merle | 226/183 |
| 4,781,782 | 11/1988 | Luhman et al. | 156/361 X |

Primary Examiner—Michael L. Lewis
Attorney, Agent, or Firm—Jordan and Hamburg

[57] ABSTRACT

An automatic tape affixing apparatus for affixing a composite tape to an adhesion form includes a tape affixing head movable in X-axis, Y-axis, Z-axis, A-axis and C-axis directions, the tape affixing head carrying a tape supply reel, a tape take-up reel, a presser roller, a drive roller, a driven roller for pressing the tape against the drive roller, the driven roller being provided with a rotary encoder for detecting the rotation amount of the driven roller, and an auxiliary roller disposed on a take-out side of the drive roller for deflecting the tape closer to the drive roller than a tangent line at a contact point of the drive roller and the driven roller, so that the same shaped symmetrically formed on the take-in and take-out sides of a pressed contact portion of the drive roller and the driven roller, and detection of the feeding amount of tape is not consequently influenced by tape feeding direction alteration.

4 Claims, 6 Drawing Sheets

AUTOMATIC TAPE AFFIXING APPARATUS

BACKGROUND OF THE INVENTION AND RELATED ART STATEMENT

The present invention relates to an apparatus for automatically affixing a tape of composite material on the surface of an adhesion form having various contours to make a lamination of the tape.

In recent years, lightweight plate materials have been produced from a tape of composite material, i.e. a tape prepared by impregnating carbon fiber, aramid fiber or like reinforcing fiber with a thermosetting resin, by affixing the tape on the surface of an adhesion form (body) having specified contours to make a lamination, and thereafter subjecting the lamination to a curing treatment with application of heat and pressure. Unexamined Japanese patent application no. SHO 58-45057, for example, discloses a known method of automatically affixing such a tape of composite material. With this method, the tape is continuously paid off from a reel and pressed against the surface (curved surface) of the adhesion form with a press roller, the press roller is moved along a predetermined path to successively affix tape portions without leaving a clearance therebetween, and the tape affixing direction is changed from layer to layer, whereby a lamination is obtained.

A conventional tape feeding device is constructed as shown in FIG. 6. A single driven roller 36 is made to press against a drive roller 3 with a tape 10 being interposed therebetween. The tape 10 from a presser roller (not shown) is fed with the rollers 3, 36 and then wound by a take-up reel 25. Further, the drive roller 3 is attached with a rotary encoder (not shown) for detecting the feeding amount of the tape 10 based upon the rotation amount of the drive roller 3.

As shown in FIG. 8, it is required that an end edge of an affixed tape is in agreement with a border 10d of a predetermined adhesion region. An initial end of the tape 10 which is formed with cutters of a tape cutting device is put on a predetermined position on the presser roller, and then affixed on the adhesion form. If the initial end of the tape 10 is set off the predetermined position and then affixed to the adhesion form, the initial end comes to be out of the border 10d of the tape adhesion region corresponding to the offset distance. In view of the above facts, it is necessary to correctly control the feeding of tape.

In the arrangement of FIG. 6, a predetermined tension is always applied to the tape 10a on both take-in and take-out sides of the drive roller 3. However, not a little resistance arises to the tape feeding due to rotational resistance of each reel along the tape feeding path, and the moment of inertia of each reel when changing the feeding speed. Consequently, it is inevitable that a slip occurs between the tape 10a and the drive roller 3. It will be seen that the slip causes a difference between an actual feeding amount and a feeding amount obtained by the rotary encoder based upon the rotation amount of the drive roller 3. Additionally, it will be seen that a single driven roller is insufficient to prevent the tape from slipping. Further, even if the driven roller 36 is pressed against the drive roller 3 more firmly, a desirable feeding force is unobtainable, conversely, the movement of the tape is hindered and needless power is then consumed.

Moreover, a bulge effect is innegligible. As shown in FIGS. 7(a) and 7(b), when a presser member 64 is pressed against a portion between points A and B or a distance $l_0$ on a surface 65 of resilient material such as rubber, the pressed portion is recessed to form a concavity 66 while the periphery of the pressed portion rises to form a convexity 67. Consequently, the distance between the points A and B comes to $l_1$ which is larger than $l_0$. Surfaces of the drive roller 3 and the driven roller 36 are made of resilient material such as rubber having a high friction coefficient to provide an increased feeding force. Consequently, as shown in FIG. 5, bulges (projection portions) 3a, 36a (34a) arises on both sides of a pressed contact portion of those rollers 3 and 36. The bulges on the right side are deformed to shapes 3b, 36b illustrated with solid lines due to a component 10f of the tension of the tape 10a. Consequently, the bulges on the right side have different shapes from those on the left side. In this case, even assuming that no slip occurs between the tape 10a and the drive roller and also that a rotary encoder for detecting the feeding amount of the tape 10a based upon rotation is attached to either the drive roller 3 or the driven roller 36, feeding amounts which are detected with respect to the same feeding differentiate depending on feeding directions. This is because of the following fact. The tape 10a is drawn between the rollers 3, 36 from the left bulges 3a, 36a when the feeding direction is "+" in FIG. 5 or a winding direction. The tape 10a is drawn between the rollers 3, 36 from the right bulges 3b, 36b when the feeding direction is "−" or a rewinding direction. However, the length of a drawn portion of the tape 10a or feeding amount is found out from the rotation amount of only one of the two rollers 3, 36. In view of the abovementioned facts, conventional apparatus involve errors in tape feeding.

SUMMARY OF THE INVENTION

The present invention has worked out to overcome the above-mentioned drawbacks. It is an object of the present invention to provide an automatic tape affixing apparatus which makes it possible to correctly detect the tape feeding amount and render an end edge of a tape in agreement with a border of an adhesion region.

An apparatus according to the present invention comprises a tape affixing head movable in X-axis, Y-axis, Z-axis, A-axis and C-axis directions, the tape affixing head carrying a tape supply reel, a tape take-up reel, a presser roller, a drive roller, a driven roller for pressing the tape against the drive roller, the driven roller being provided with a rotary encoder for detecting the rotation amount of the driven roller, and an auxiliary roller disposed on an take-out side of the drive roller for deflecting the tape closer to the drive roller than a tangent line at a contact point of the drive roller and the driven roller.

According to the present invention, it is appropriate that a plurality of driven rollers are provided around the drive roller, one of which is provided with a rotary encoder.

In accordance with the present invention, the feeding amount of a tape is detected based upon the rotation amount of the driven roller, and the tape is deflected closer to the drive roller than a tangent line at a contact point of the drive roller and the driven roller by the auxiliary roller disposed on the take-out side of the drive roller. Further, the plurality of driven rollers are pressed against the drive roller so that few slip between the tape and the rollers occurs.

DETAILED DESCRIPTION OF PREFERRED EMBODIMENT

Figure 2:
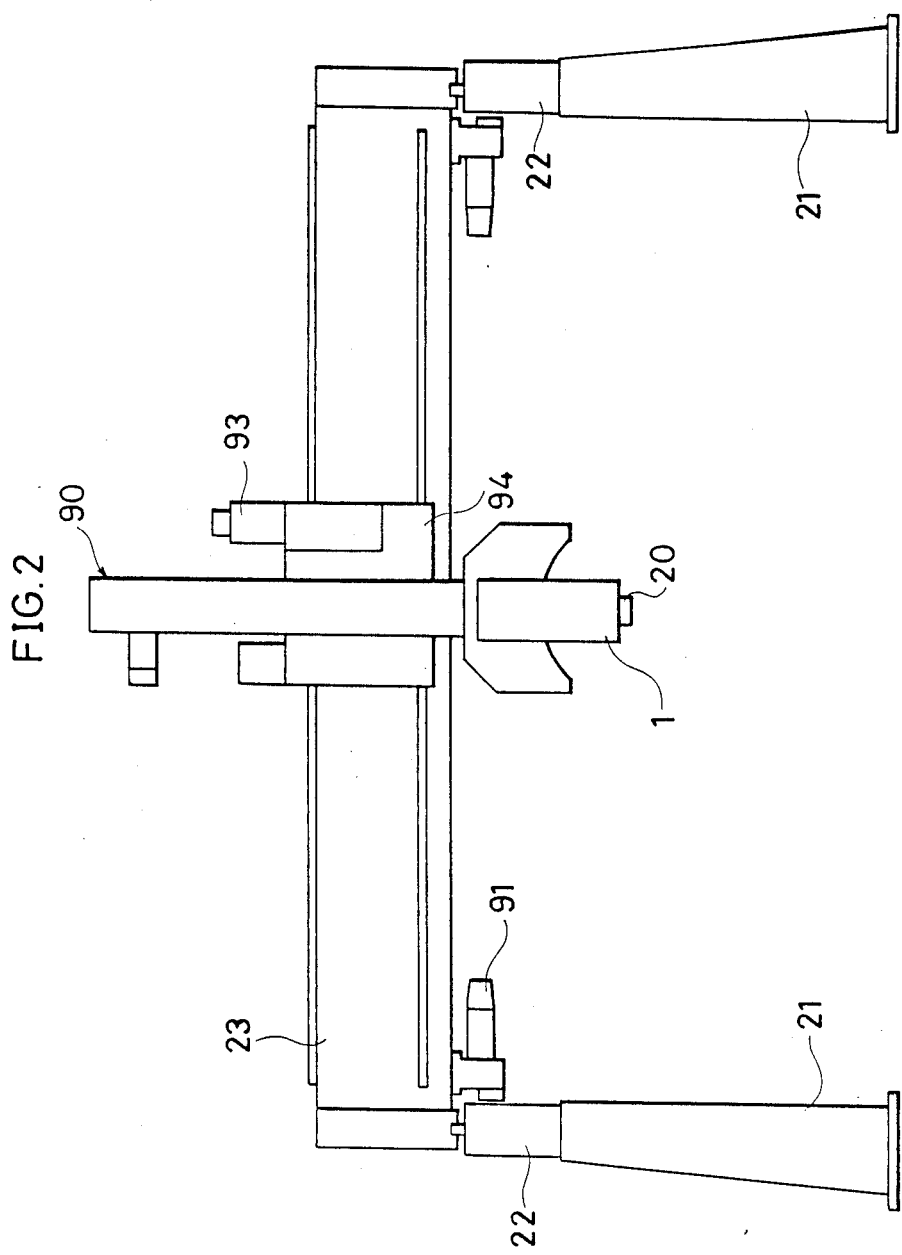
FIG. 2 is an overall schematic elevational view of the embodiment.
Figure 3:
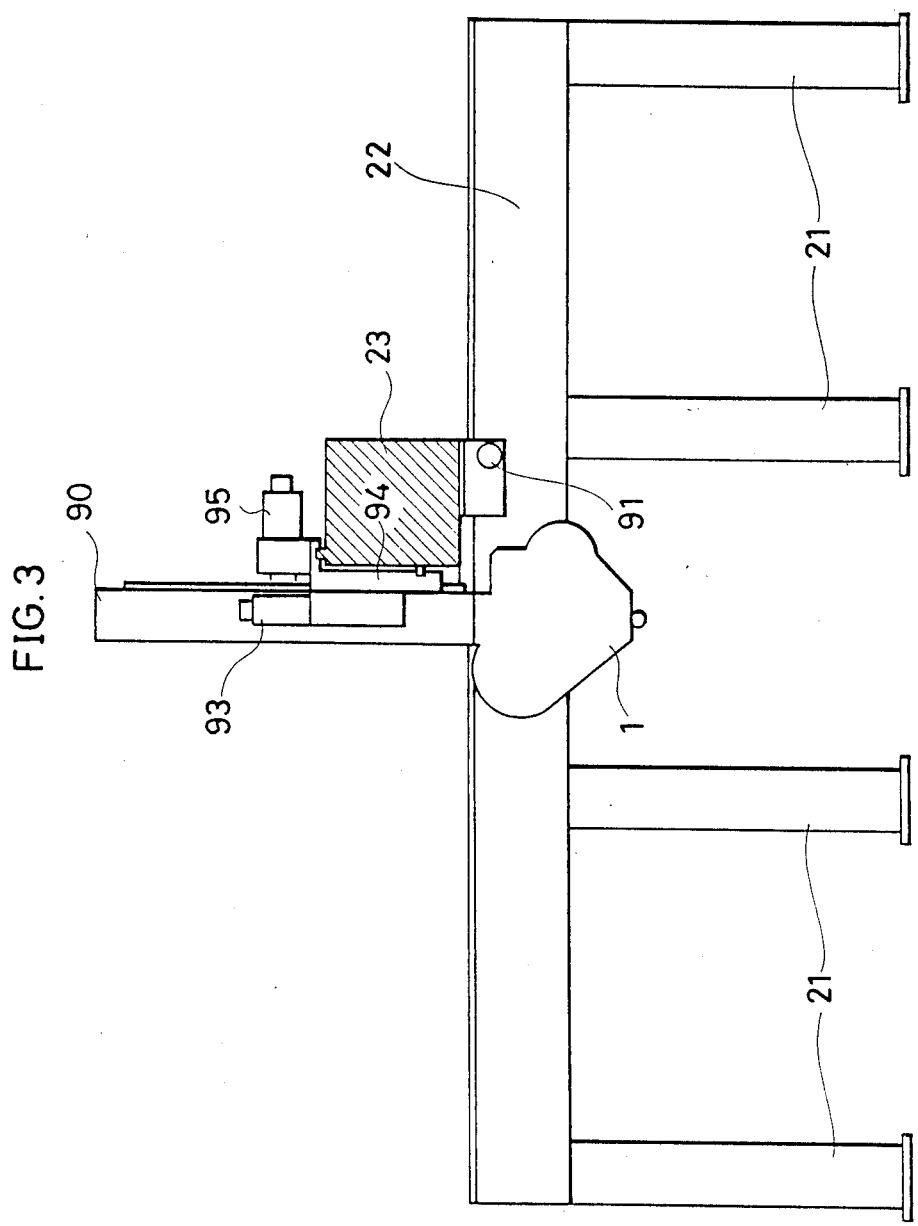
FIG. 3 is a side view thereof.

With reference to FIGS. 2 and 3, a pair of side rails 22 supported by columns 21 are arranged in parallel to each other. A cross rail 23 extends between and is supported by the side rails 22. The cross rail 23 is movable on the side rails 22 by an X-axis servomotor 91 in the direction of X axis (perpendicular to the plane of FIG. 2). A Y-axis saddle 94 mounted on the cross rail 23 is movable by a Y-axis servomotor 93 along the cross rail 23 in the direction of Y-axis (laterally in FIG. 2). A Z-axis saddle 90 mounted on the Y-axis saddle 94 is movable by a Z-axis servomotor 95 in the direction of Z axis (vertically).

Figure 4:
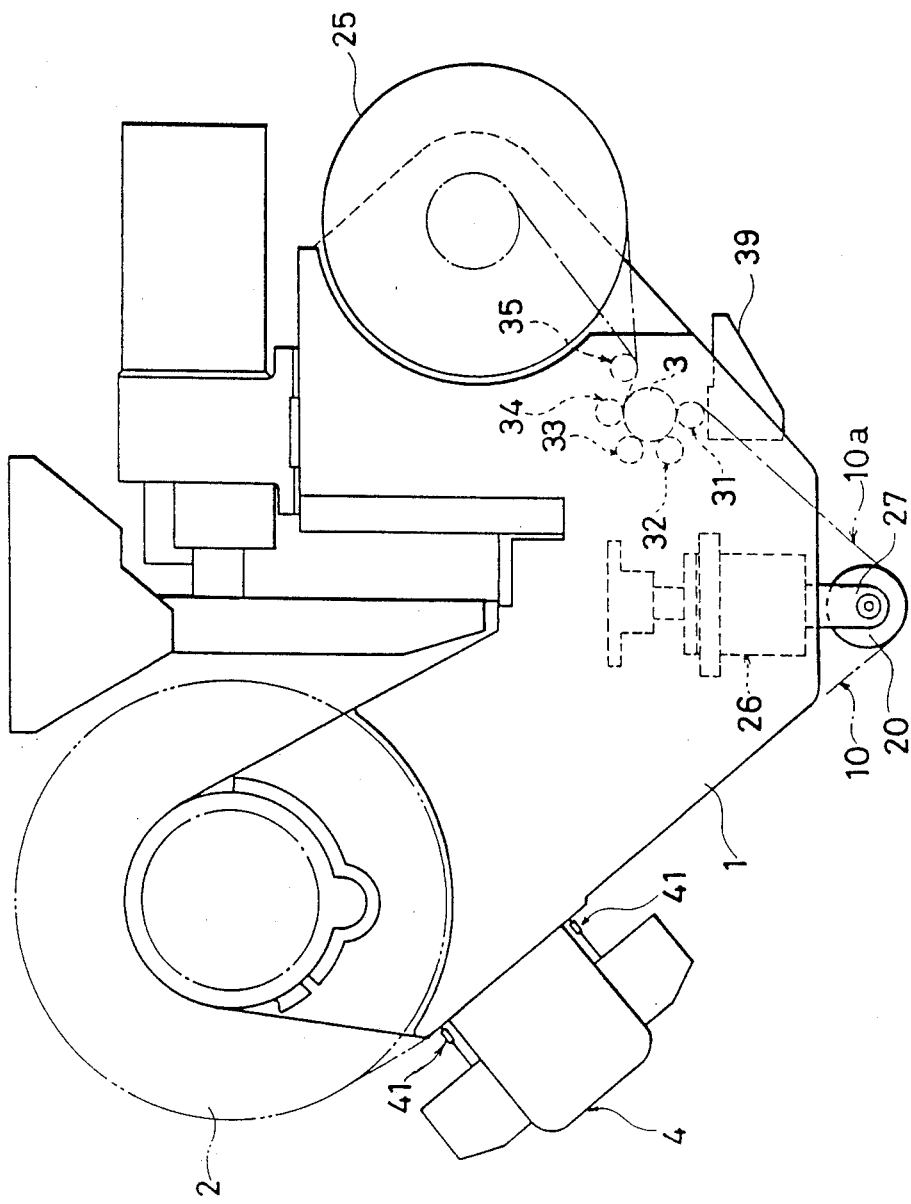
FIG. 4 is a side view of a tape affixing head.

As shown in FIG. 4, a tape affixing head 1 is provided with a tape supply reel 2 and a take-up reel 25. The tape supply reel 2 carries a roll of double layer tape 10 consisting of composite tape and backing paper. The take-up reel 25 winds up only the backing paper 10a. The tape 10 paid off from the reel 2 is cut in a predetermined length by cutters 41 of a tape cutting device 4. However, the backing paper is not cut. In other words, composite tape only is cut. Cut-off strips of the composite tape are then pressed on an adhesion form by a presser roller 20, and the backing paper 10a is run around a drive roller 3 (pinch roller) and then wound on the take-up reel 25. Reference numeral 39 designates a scrap tape collection box.

The presser roller 20 is held by a bracket 27 of a roller holding means 26 attached to the tape affixing head. A plurality of driven rollers 31, 32, 33 and 34 are disposed around the drive roller 3, each of which presses the tape 10a against the peripheral surface of the drive roller 3. An auxiliary roller 35 defines the taking-up direction of the tape 10 from the drive roller 3.

Figure 1:
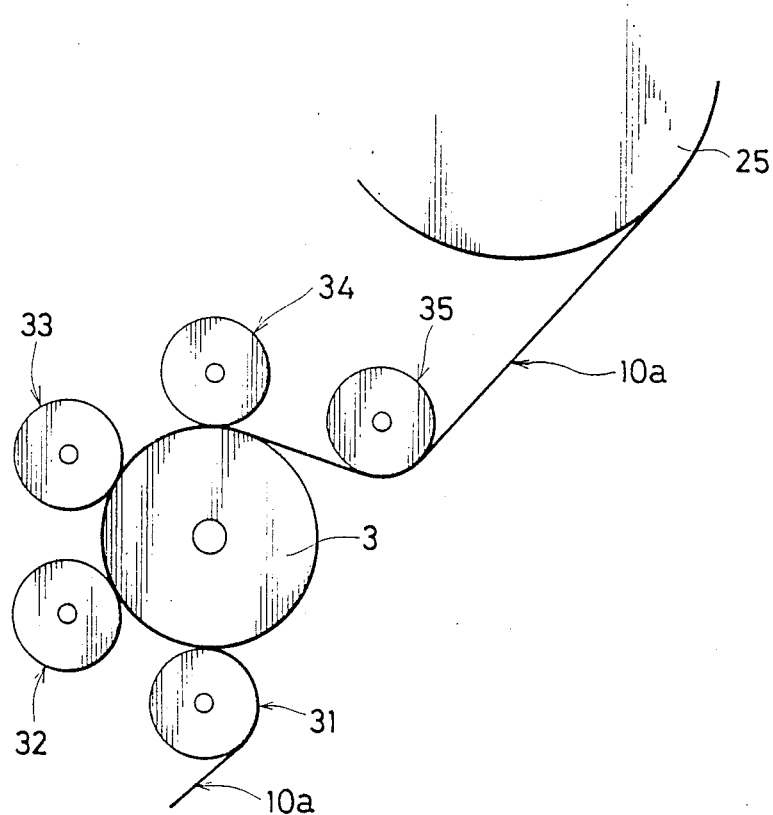
FIG. 1 is a side view of a tape feeding device of an embodiment according to the present invention.

As shown in FIG. 1, the driven rollers 31, 32, 33, 34 are pressed against the drive roller 3, between which the tape 10a is placed. The auxiliary roller 35 is disposed on the tape take-out side of the drive roller 3 so as to deflect the tape 10a closer to the drive roller 3 than a tangent line at the contact point of the drive roller 3 and the last driven roller 34. Further, the last driven roller 34 is provided with a rotary encoder not shown. It should be noted that the rotary encoder is not attached to the drive roller 3 but to the last driven roller 34.

Now, the operation of the apparatus will be described. X-axis, Y-axis and Z-axis servomotors 91, 93 and 95 are actuated to press the presser roller 20 provided at the forward end of the tape affixing head 1 against the adhesion form and move the tape affixing head 1 along a programmed path over a surface of the adhesion form while feeding the tape 10 from the supply reel 2 at a predetermined rate and tension, whereby the tape 10 is affixed on the surface of the adhesion form.

In this operation, the tape 10a is held with the drive roller 3 and the respective driven rollers 31 to 34 and fed by the rotation of the drive roller 3. The tape supply reel 2 and the take-up reel 25 are respectively provided with servomotors which are driven in accordance with optimum torque commands to provide a predetermined tension to the tape 10.

The feeding amount of the tape 10a is detected by the rotary encoder attached to the driven roller 34 based upon the rotation amount of the driven roller 34. The driven roller 34 rotates following the movement of the tape 10a. The rotational resistance of the driven roller 34 is so small that few slip occurs between the tape 10a and the driven roller 34. Accordingly, accurate feeding amount of the tape 10a can be detected.

Also, since the plurality of driven rollers are pressed against the drive roller 3 with the tape 10a being interposed, the tape 10a is firmly held and a considerably smaller amount of slip occurs between the drive roller 3 and the tape 10a.

Figure 5:
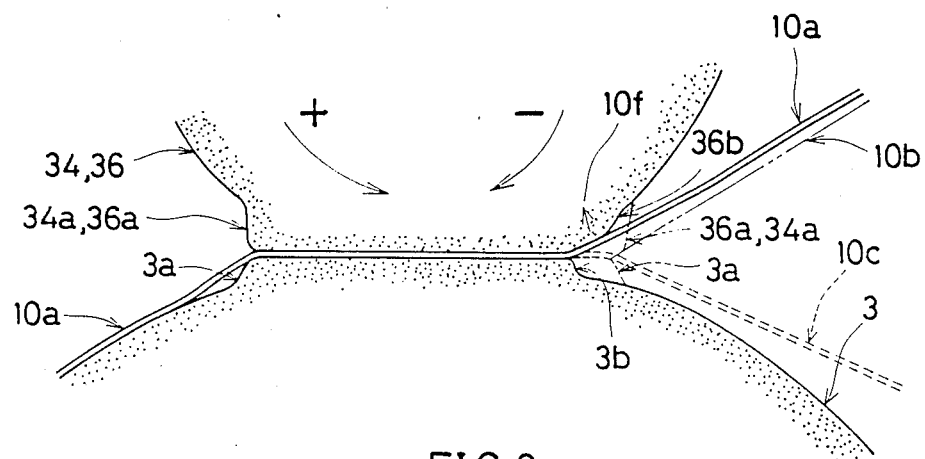
FIG. 5 is a diagram illustrating a pressed contact portion of a drive roller and a driven roller.
Figure 6:
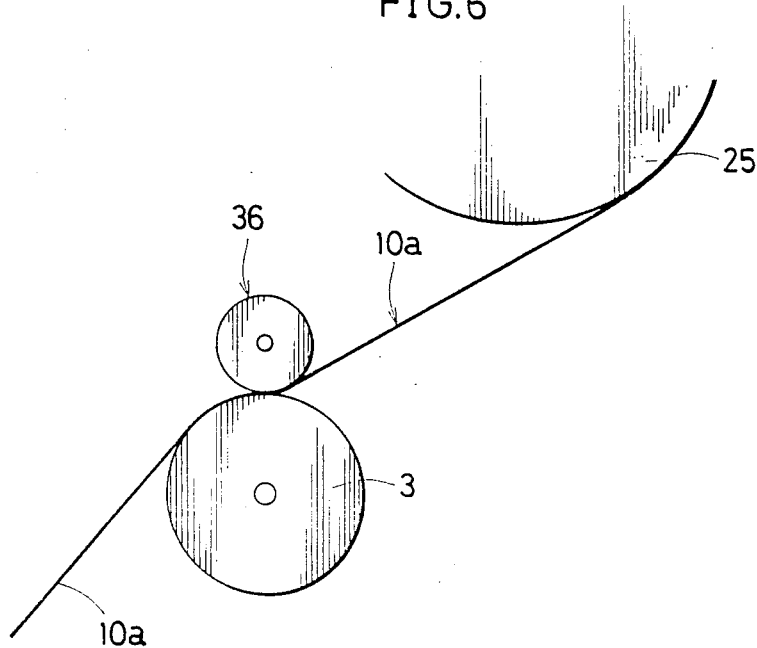
FIG. 6 is a side view of a conventional tape feeding device.
Figure 7A:
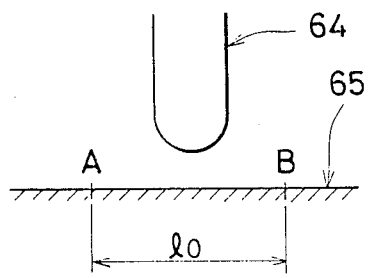
FIG. 7(a) and 7(b) are diagrams illustrating bulge effect.
Figure 7B:
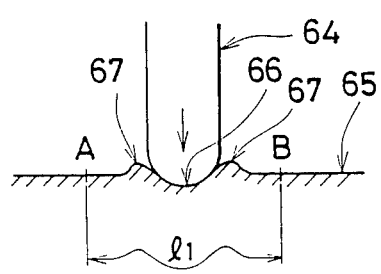
Figure 8:
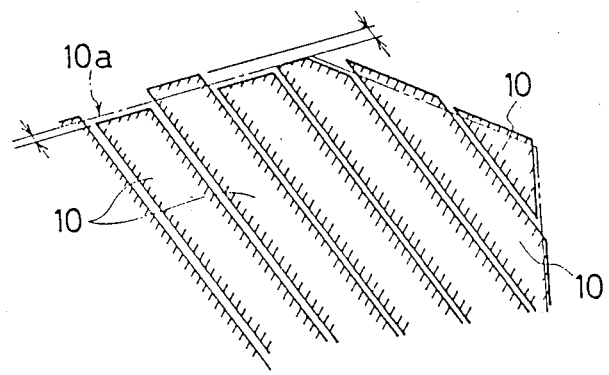
FIG. 8 is a diagram illustrating a border of a tape adhesion region.

Furthermore, the auxiliary roller 35 is disposed on the tape take-out side to deflect the tape 10a closer to the drive roller 3 than a tangent line at the contact point of the drive roller 3 and the last driven roller 34. Consequently, the tape 10a is deflected as broken lines 10c in FIG. 5, so that the relative position of the tape 10a to the rollers 3 and 34 is the same on both sides, and the bulges 3a, 34a on the take-in side are then formed on the take-out side. Accordingly, the feeding amount of tape can be errorlessly detected independently of tape feeding directions and accurate positioning of the tape can be accomplished.

According to the present invention, in which the feeding amount of a tape is detected based upon the rotation amount of a driven roller which does not slip over the tape, the tape feeding amount can be accurately detected. The tape is taken up closer to a drive roller than a tangent line at a contact point of the drive roller and the driven roller by an auxiliary roller disposed on the take-out side of the drive roller, detection of the tape feeding amount is not influenced by feeding direction alteration and an end position of the tape can be accurately determined. Further, since a plurality of driven rollers are pressed against the drive roller, the slipping between the tape and the rollers can be surely reduced.

What is claimed is:

1. An automatic tape affixing apparatus comprising a tape affixing head movable about a plurality of axes, said tape affixing head having a tape supply reel and a tape take-up reel, said tape moving along a tape path between said supply reel and said take-up reel, a presser roller disposed along said tape path, a drive roller and a plurality of driven rollers biased toward said drive roller and disposed along said tape path such that said tape passes between said drive roller and said driven rollers, said drive roller being made of a resilient material such that said biasing of said drive and driven rollers towards one another affects bulging of said resilient drive roller at a contact location where said drive roller contacts said driven rollers, said tape being in contact with said supply reel side of said drive roller juxtaposed to said contact location, a rotary encoder means on one of said driven rollers for detecting the amount of rotation of said one driven roller, an auxiliary roller disposed between said drive roller and take up reel, said plurality of driven rollers including an end roller, said auxilary roller being located so as to deflect said tape from said drive roller in a direction closer to said drive roller than a tangent line at the contact point of said drive roller and said end driven roller and the relative position of the tape to said drive roller and said end driven roller is the same on each side, whereby the amount of tape feed is accurately determined for each direction of tape feed.

2. An automatic tape affixing apparatus according to claim 1, wherein said driven roller is made of resilient material.

3. An automatic tape affixing apparatus according to claim 1, wherein said tape passes forwardly from said supply reel to said take-up reel for affixing a tape component to a surface by said presser roller, said tape being fed in a reverse direction to provide for placing an end of said tape at a desired position.

4. An automatic tape affixing apparatus comprising a tape affixing head movable about a plurality of axes, said tape affixing head having a tape supply reel and a tape take-up reel, said tape moving along a tape path between said supply reel and said take-up reel, a presser roller means disposed along said tape path, a drive roller means and a driven roller means biased toward one another and disposed along said tape path such that said tape passes between said drive roller means and said driven roller means, said drive roller means being made of a resilient material such that said biasing of said drive and driven roller means towards one another effects bulging of said resilient drive roller means at a contact location where said drive roller means contacts said driven roller means, said driven roller means comprising a plurality of driven rollers said tape being in contact with said supply reel side of said drive roller means juxtaposed to said contact location, a rotary encoder means on one of said driven rollers for detecting the amount of rotation of said driven roller means, one of said plurality of driven rollers being an end roller, an auxiliary roller disposed between said drive roller means and said take-up reel, said auxiliary roller being located so as to deflect said tape in a direction closer to said drive roller than a tangent line at the contact point of said drive roller and said end driven roller and the relative position of the tape to said drive roller and said end driven roller is the same on each side, whereby the amount of tape feed is accurately determined for each direction of tape feed.

* * * * *